July 5, 1938.   P. ORR   2,122,892
CLUTCH STRUCTURE
Filed June 1, 1936   2 Sheets-Sheet 1
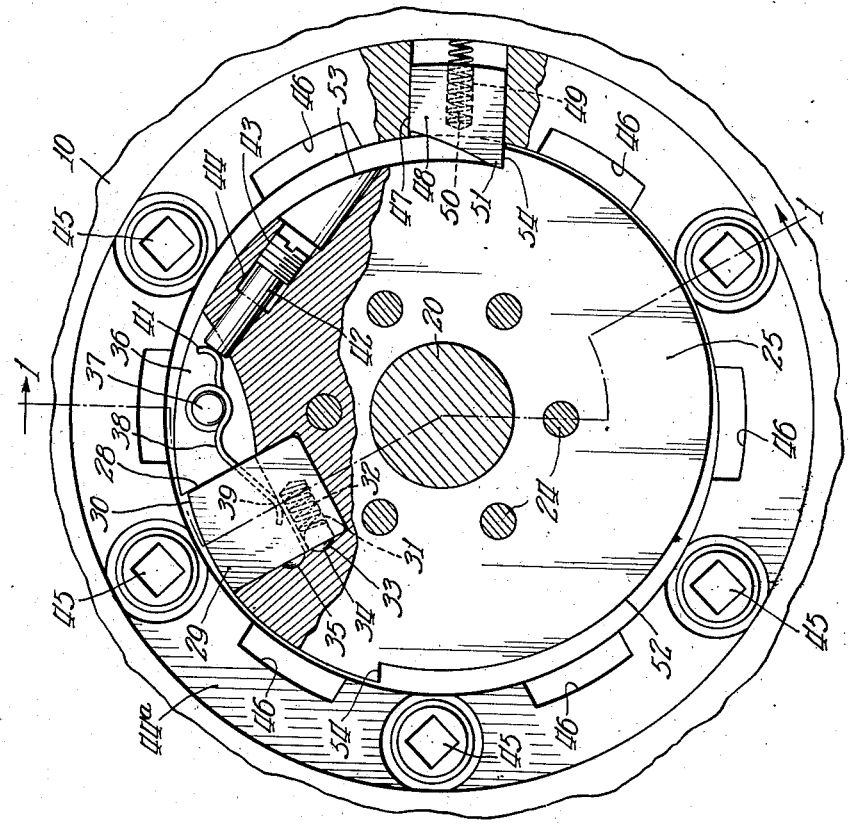
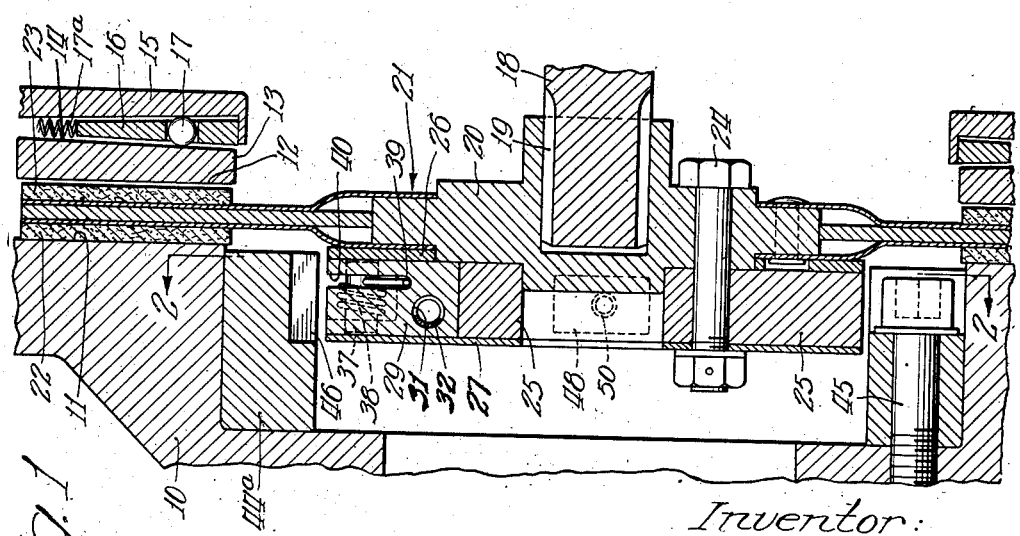
Inventor:
Palmer Orr.
By: Edward C. Gritzbaugh
Atty.

July 5, 1938.  P. ORR  2,122,892
CLUTCH STRUCTURE
Filed June 1, 1936  2 Sheets-Sheet 2
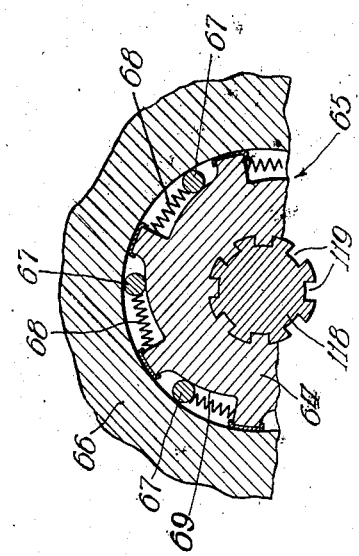
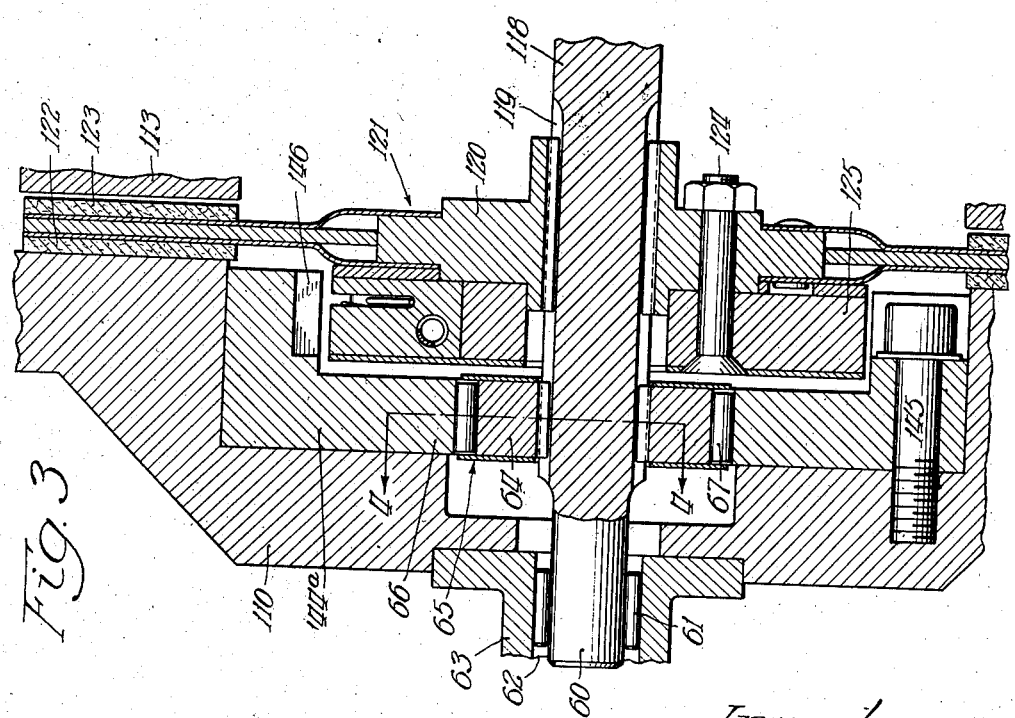
Inventor:
Palmer Orr
By: Edward C. Gridhaugh
Atty.

Patented July 5, 1938

2,122,892

UNITED STATES PATENT OFFICE 2,122,892

CLUTCH STRUCTURE

Palmer Orr, Muncie, Ind., assignor to Borg-Warner Corporation, Chicago, Ill., a corporation of Illinois Application June 1, 1936, Serial No. 82,730

9 Claims. (Cl. 192—48)

This invention relates to a clutch, and has to do particularly with auxiliary mechanism for controlling relative rotative movement between primary driving and driven clutch parts.

Where in motor driven vehicles automatic clutch mechanism is used for coupling the motor to the vehicle running gear upon an increase in speed of the vehicle motor, there is a tendency for the driving and driven parts of the clutch to slip when delivering torque while the vehicle engine is rotating at low speeds. Frequently, such slippage between the clutch driving and driven parts is decidedly undesirable as for example when the driver wishes to proceed at slow speed with a high speed ratio power train interposed between the engine and the vehicle running gear.

Automatic speed responsive clutches of the type mentioned above have the further disadvantage of being incapable of transmitting torque from the running gear to the engine when the engine is "dead" or idling. The clutch cannot, therefore, be used as a coupling between the running gear and engine whereby said engine may be started by pushing the vehicle or permitting the vehicle to move down an incline by the force of gravity.

An object of the present invention is to provide in a speed responsive automatic clutch structure, an improved auxiliary automatic mechanism operative to positively inter-connect the driving and driven parts of said clutch after a predetermined rotative speed has been reached and incident to the occurrence of but a slight relative slippage of said parts.

A further object of the present invention is the provision of an auxiliary mechanism of the type mentioned above adapting the driving and driven clutch parts to slip past one another without noise when their relative movement is greater than that at which they may be inter-connected.

Another object of the present invention is the provision of an auxiliary clutch mechanism providing means whereby inter-locking of primary driving and driven clutch parts is permitted at one speed and unlocking of those parts is permitted only at a lower speed.

Still another object of the present invention is the provision in combination with an automatic speed responsive friction clutch of a jaw clutch device operative, when the driving part of the friction clutch is substantially quiescent rotatively, to lock the driven clutch part against overrunning the driving clutch part, but permitting the driving clutch part to overrun the driven clutch part, and said auxiliary jaw clutch device becoming inoperative between said driving and driven parts upon sufficient increase in rotative speed of the clutch.

These and other desirable objects of the invention will become apparent upon reading the following description in conjunction with the drawings hereby made a part of the specification, and wherein:

Fig. 1 is a fragmentary sectional view taken through a clutch embodying the present invention, as indicated on the line 1—1 of Fig. 2;

Fig. 2 is a fragmentary view of the clutch taken on the line 2—2 of Fig. 1, there being parts shown in section for clarity;

Fig. 3 shows a modified form of clutch structure; and

Fig. 4 is a sectional view taken on the line 4—4 of Fig. 3.

Like reference characters are used for designating similar parts shown throughout the drawings and described hereinafter.

The clutch as shown in Figs. 1 and 2 is built into the fly-wheel 10 of a vehicle engine, not shown. An annular clutch face 11 is provided upon the back of the fly-wheel 10 for cooperation with an opposed clutch face 12 upon the front of a pressure ring 13. The pressure ring 13 has a radially inclined surface 14 upon its rear face. Clutch cover member 15 is secured in any standard manner to the fly-wheel 10 for rotation therewith, the cover member 15 carrying the pressure ring 13 and a plurality of spaced-apart centrifugal weights 16 arranged about the back of the ring 13. Each of the weights 16 may have a roller bearing 17 journalled therein for contacting the opposed surfaces of the cover plate 15 and the pressure ring 13. The weights are urged radially inwardly by springs 17a. It will be understood that the centrifugal mechanism 16—17—17a is simply illustrative; any form of speed responsive clutch closing mechanism may be substituted therefor.

In axial alignment with the engine fly-wheel 10 is a driven shaft 18 having splined thereon at 19 the hub 20 of the clutch driven part 21. Said clutch part 21 is substantially in the form of a disk and has annular clutch facings 22 and 23 upon its opposite sides. Clutch facings 22 and 23 are adapted to be engaged respectively by the back face 11 of the fly-wheel and the front face 12 of the annular pressure member 13.

The hub 20 of the clutch driven part 21 has secured thereto by means of bolts 24, a core member 25 which may have circular plates 26 and 27 on opposite sides thereof. In Fig. 2 the core 25 will be seen to have a deep radial notch 28 cut in its periphery. The notch 28 contains a radially movable centrifugal weight 29 having a curved outer edge 30 having a center of curvature eccentric of the clutch axis. When the weight 29 is retracted into the notch 28 as shown in Fig. 2, the left edge of the curved surface 30 will be substantially flush with the periphery of the core 25, whereas the right edge of curved surface 30 will be countersunk somewhat with respect to the periphery of said core member. The weight 29 is recessed at 31 to adapt it to contain a compression spring 32 and a ball 33, the latter being urged at all times by said spring into contact with the side wall of the notch 28. When the centrifugal weight 29 is in its innermost position, said ball 33 will engage a seat 34 and when said weight is in its outward radial position, as will be explained later, the ball 33 will engage a seat 35. Thus, the ball 33 through the cooperation of the spring 32 and seats 34 and 35 tends to maintain the centrifugal weight 29, in either its inner or outer radial position.

Adjoining the notch 28 is a cut-away section 36 opening into the circular periphery of the core 25. A pin 37 anchored within a side wall of the cut-away section 36 has wrapped thereabout a spring 38 which has an end 39 extending into a slot 40 of the centrifugal weight 29 and bearing against the bottom of the slot 40, whereby the centrifugal weight is constantly urged into its retracted position. The opposite end 41 of the spring 38 rests reactively against an adjustable stop 42, which has a threaded connection at 43 with the side wall of a channel 44 cut tangentially of the core 25. The tension of the spring 38 may be adjusted by turning the member 42, whereby it is adjusted axially of the channel 44. If desired, more than one of the centrifugal weights 29 and cooperating parts therefor carried upon the core 25 may be employed. Only one of the centrifugal weights 29, however, is shown to simplify the present disclosure.

Disposed equidistantly about the inner periphery of a ring 44a held to the fly-wheel 10 by means of a plurality of bolts 45 are a series of notches 46. In Fig. 2 it will be noted that the notches 46 are of such a width as adapts them to receive the outer end of centrifugal weight 29. The ring 44a also contains one or more notches 47 containing a centrifugal weight 48. The weight 48 has therein a recess 49 containing one end of a radially disposed spring 50. The opposite end of the spring 50 bears against the fly-wheel 10 whereby said weight 48 is urged radially inwardly to press the nose 51 thereof against the circular peripheral edge of the core 25. At this time it will be noted that such edge of the core 25 has two convolute sections 52 and 53, each extending 180 degrees about said core and being separated from the other by a tooth-like section 54.

The operation of the mechanism is as follows:
When the vehicle engine to which the fly-wheel 10 is connected is quiescent or is rotating at a speed no greater than idle speed, the centrifugally responsive mechanism 16—17—17a carried by the fly-wheel will be insufficiently energized to cause operative engagement of the frictional or principal driving and driven parts of the clutch. When, however, the speed of the engine and of the fly-wheel 10 is increased above engine idling speed, the centrifugal weights 16 will be moved radially outwardly whereby the clutch pressure ring 13 will be moved forwardly for engaging the friction driving and driven parts. Power will then be transmitted from the engine and through the fly-wheel 10 to the clutch facings 22 and 23, and through the clutch driven element 21 to the driven shaft 18 and thence to the vehicle running gear through the intervention of any conventional change speed mechanism. While the vehicle is being driven at ordinary cruising speeds and with normal torque delivery through the friction elements of the clutch, little or no slippage will occur between the driving and driven clutch parts. The centrifugal mechanism for automatically operating the friction parts of the clutch is designed so as to substantially preclude slipping during such operating conditions.

Should, however, the vehicle be slowed down and the speed of the fly-wheel 10 be correspondingly decelerated, the force exerted by the centrifugal weights 16 axially of the device for pressing the pressure plate 13 against the clutch facing 23 will be inadequate to permit transmittal of the entire available engine torque from the driving clutch part to the driven clutch part. It is to meet such emergencies as this that the auxiliary clutch mechanism comprising the centrifugal weight 29 and the ring 44a is provided. While the vehicle is being driven through the primary parts of the clutch at a predetermined speed, the weight 29 will be thrown centrifugally outwardly incident to displacing the ball 33 from the seat 34 against the urge of the spring 32, and the curved edge 30 of the weight 29 will be brought to bear against the inner periphery of the ring 44a. Ordinarily, when this movement of the centrifugal weight 29 occurs, said weight will not be in registry with a notch 46. Should, however, the weight 29 be in registry with a notch 46 and the relative speed of the clutch driving and driven parts be slight, the weight would be advanced into such notch and the ball 33 carried into registry with the ball seat 35. The weight 29 would then lock the driving and driven parts of the clutch together for positive rotation so long as the speed of the clutch remained sufficient for the centrifugal force of the weight, combined with the action of the ball 33 bearing against the seat 35, to resist the force of the spring 38 urging the weight 29 into its retracted position. The design of the weight 29, the spring 38 and the detent parts 32, 33, 34 and 35 of the centrifugal weight mechanism is such that the speed of the clutch at which the weight 29 will be moved radially inwardly from connection with a notch 46 will be considerably less than the speed at which the centrifugal weights 16 will permit of slippage between the friction parts of the clutch. When the centrifugal weight 29 moves outwardly while unregistered with a notch 46, it will be stopped by abutting with the inner periphery of the ring 44a. Because of the centrifugal force of the weight 29, it will bear firmly against such inner periphery even though the clutch is rotating at such a slow speed that the inertia weights 16 permit of slippage of the friction parts of the clutch, and upon a slight slippage of the friction parts of the clutch the ring 44a will be rotated slightly with respect to the core 25 until a notch 46 is carried into registry with the weight 29, whereupon the weight will snap into the registered notch. Thereafter, slippage of the driving and driven clutch parts will be precluded until a much lower speed at which the spring 38 becomes operative to slip the weight 29 from its notch 46. Obviously, the frictional force between the side of the weight 29 while in driving engagement with a side of a notch 46 will offer resistance to the force of the spring 38, so that when torque is being delivered through the auxiliary clutch mechanism the weight 29 will be retracted from a notch 46 at a lower speed than if there were no torque delivery.

While the clutch device is being normally engaged for driving the vehicle, the fly-wheel 10 and the ring 44a will at first overrun the driven clutch part 21 carried upon the shaft 18 until such time as the pressure plate 13 firmly engages the clutch facing 23. Meanwhile, the fly-wheel and ring 44a are rotating relatively to the core 25, and the centrifugal weight 48 is carried about the convolute peripheral sections 52 and 53 while ratcheting over the notches 54. The spring 50, however, is made relatively light so that such ratcheting of the weight 48 does not occur when the fly-wheel 10 is rotated above a very low speed.

Should it be desired to start the vehicle engine by pushing the vehicle or by allowing the vehicle to coast down hill, the principal driving and driven parts of the clutch would be ineffective because of the centrifugal weights 16 being retracted. To meet such an emergency, the weight 48 is provided. While the fly-wheel 10 is quiescent, the spring 50 will be effective for advancing the nose 51 of the weight 48 into the path of one of the notches 54 whereby the core 25 is not permitted to overrun the fly-wheel when rotated in the direction of engine turnover. But upon the engine being started, the fly-wheel 10 will immediately rotate faster than the core 25, whereby the weight 48 will be carried over the convolute surfaces 52 and 53, and upon the fly-wheel attaining a predetermined speed the weight 48 will be thrown centrifugally completely out of contact with the core.

For the most part the elements shown in Figs. 3 and 4 are the same as in Figs. 1 and 2, the principal difference being that a different type of clutch is employed to adapt the vehicle motor being started by pushing the vehicle or by permitting the vehicle to coast down-hill. Corresponding parts shown in the higher numbered figures are designated by the same reference characters plus one hundred.

It will be noted upon an examination of Fig. 3 that the clutch hub 120 has an aperture extending completely therethrough and is splined for connection with the driven shaft 118. Driven shaft 118 extends forwardly where it has a reduced section 60 piloted upon needle bearings 61 in a recess 62 within the back end of the crank shaft 63 carrying the fly-wheel 110. The splined section 119 of the driven shaft 118 is projected forwardly where connection is had with the inner element 64 of an overrunning clutch 65. An outer element 66 of the overrunning clutch 65 is formed by an extension of the ring 144a. Clutch rollers 67 are disposed between the elements 64 and 66. Cam surfaces 69 upon the inner element 64 are so inclined that the fly-wheel 110 may overrun the shaft 118 during clockwise rotation of the engine and to preclude clockwise rotation of the driven shaft 118 and the inner element 64 with respect to the engine, and hence adapt the device to couple the driven shaft 118 with the engine crankshaft 63 for starting the engine. If desired, springs 68 may be used for urging the rollers 67 toward the locking position between the inner and outer elements of the overrunning clutch 65.

While certain specific structures have been illustrated herein, I am aware that those familiar with the art may devise modifications falling within the spirit of the invention which is coextensive in scope with the appended claims.

I claim:

1. A clutch structure comprising driving and driven parts, clutch means non-restrictive of relative rotation between said parts at low speeds but adapted to establish a driving connection therebetween at higher speeds, and a unidirectional drive clutch means adapted to preclude the driven part overrunning the driving part at low speeds but becoming inoperative upon sufficient increase in speed.

2. A clutch structure comprising driving and driven parts, clutch means non-restrictive of relative rotation between said parts at low speeds but adapted to establish a positive driving connection between said parts upon their approach of synchronism at higher speeds, and other clutch means adapted to preclude the driven part overrunning the driving part at low speeds but becoming inoperative upon sufficient increase in speed.

3. In combination with driving and driven parts, a clutch structure comprising a core in driving relation with the driven part and having a clutch engaging section, a movable speed responsive clutch member rotatable with said core, said driving part having a clutch section engageable by said movable member, a speed responsive clutch member rotatable with the driving member and movable into operative connection with the clutch engaging section of said core, and independent means for establishing a driving coupling between said driving and driven parts.

4. In a clutch, driving and driven parts, means operable to establish a frictional driving connection between said parts upon an increase in speed of the driving member, centrifugal clutch means non-restrictive of slippage in said frictional driving connection at low speeds but becoming adapted to positively connect said parts upon an increase in clutch speed and approach of synchronism of said parts, and other centrifugal clutch means adapted to preclude the driven part overrunning the driving part at low speeds but becoming inoperative upon sufficient increase in speed.

5. In a clutch structure, driving and driven parts, speed responsive means adapted to frictionally engage said parts whereby power may be transmitted therebetween, said frictional engagement being released upon a reduction in speed of the clutch parts, and speed responsive clutch means adapted to establish a positive driving connection between said parts subsequent to such frictional engagement, said speed responsive clutch means being adapted to release such positive connection at a speed lower than the release of the frictional engagement.

6. A clutch structure comprising a recessed driving part and a driven part, means for rotating said driving part, clutch means non-restrictive of relative rotation between said parts at low speeds but adapted to establish positive driving connection between said parts incident to the driving part slightly overrunning the driven part at higher speeds, said clutch means comprising speed responsive members on the driven part for engagement with the recesses on the driving part, spring means tending to withdraw the members from the recesses, and friction means, operative upon the functioning of said clutch means drivingly to interconnect said driven part and the driving part, tending to prevent the withdrawal of the members from the recesses, whereby withdrawal of the members is effected at a speed lower than the speed at which the members engage the recesses, and unidirectional drive clutch means for precluding the driven part overrunning the driving part.

7. A clutch structure comprising a driving part and a driven part, means for rotating said driving part, clutch means non-restrictive of relative rotation between said parts at low speeds but adapted to establish positive driving connection between said parts incident to the driving part slightly overrunning the driven part at higher speeds, said clutch means comprising speed responsive members on the driven part for engagement with the recesses on the driving part, spring means tending to withdraw the members from the recesses, and friction means operative upon the functioning of said clutch means drivingly to interconnect said driven part and the driving part, tending to prevent the withdrawal of the members from the recesses, whereby withdrawal of the members is effected at a speed lower than the speed at which the members engage the recesses, and other clutch means comprising a centrifugally operated pawl on the driving part, spring means biasing the pawl radially inward at all times, and a ratchet on the driven part adapted to cooperate with the pawl at speeds ranging from zero to the speed at which the driving part drives the driven part.

8. A clutch for interconnecting driving and driven parts comprising in combination, a first clutch means automatically operable frictionally to interconnect said parts upon the increase in speed of the driving part beyond a predetermined R. P. M., a second clutch means automatically operable positively to interconnect said parts when the driven part exceeds a predetermined speed, and a third clutch means for establishing a one-way drive connection between said parts whereby to prevent said driven part from overrunning said drive part.

9. A clutch, as defined in claim 8, wherein said third clutch means is automatically inoperative at speeds of said drive part exceeding a predetermined R. P. M.

PALMER ORR.